Feb. 21, 1967

LE GRAND H. LULL 3,305,118

LOAD HANDLING CARRIAGE

Filed Jan. 19, 1966

INVENTOR.
LE GRAND H. LULL
BY
Braddock + Burd
ATTORNEYS

Feb. 21, 1967 LE GRAND H. LULL 3,305,118
LOAD HANDLING CARRIAGE
Filed Jan. 19, 1966 3 Sheets-Sheet 2

INVENTOR.
LE GRAND H. LULL
BY
*Braddock & Burd*
ATTORNEYS

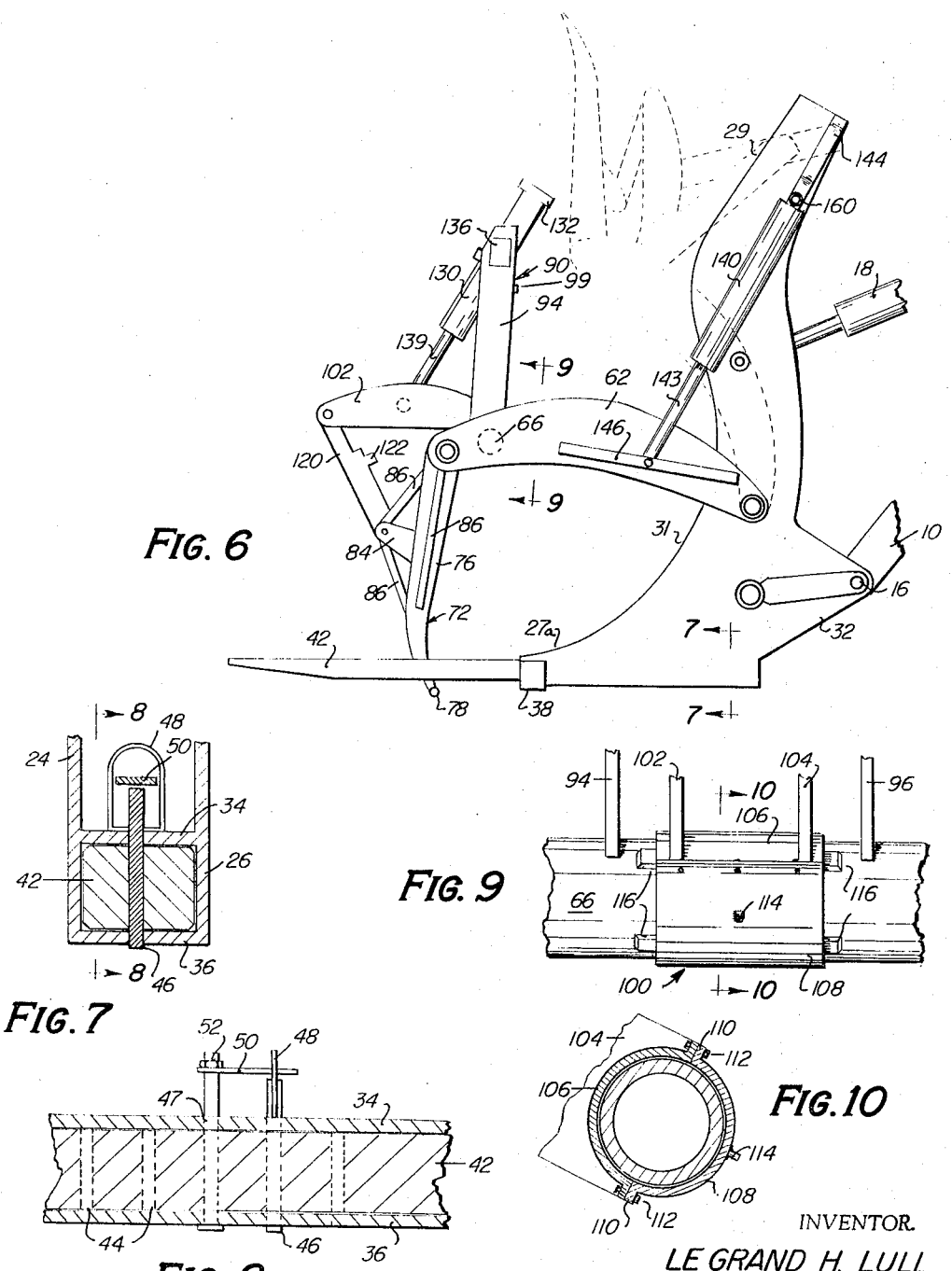

United States Patent Office

3,305,118
Patented Feb. 21, 1967

3,305,118
LOAD HANDLING CARRIAGE
Le Grand H. Lull, 5501 Woodlawn Blvd.,
Minneapolis, Minn. 55417
Filed Jan. 19, 1966, Ser. No. 521,730
9 Claims. (Cl. 214—767)

This invention relates to a load handling cradle carriage for a mobile front end loader of the type shown and described in my copending application Serial No. 492,352 filed September 20, 1965 and entitled "Front End Loader" of which the present application is a continuation-in-part.

The cradle carriage of the present invention is characterized by versatility and dependability in enabling a loader to lift, carry and stack various articles such as logs, pipe, lumber, palletized products and the like. The carriage may be tilted through a wide vertical angle to maintain the forks thereof at any desired position from vertically downward, to horizontal, as well as forwardly and upwardly. The carrier includes hold down or load clamping means cooperable with the fork tines to clamp and hold articles therebetween in any of the carrier positions. The carriage may be moved through a substantial vertical plane while maintained at any desired tilted position or simultaneously moved vertically and tilted as demanded by the particular task being performed. The carriage is adapted to descend vertically into a confined space behind a barrier wall, such as a gondola car, for example, to load or unload articles therein. The same carriage structure utilized for handling elongated articles such as logs, poles, pipe, etc., is adapted for handling palletized articles in the manner of an ordinary lift truck.

The invention is illustrated in the accompanying drawings in which the same numerals are used to identify corresponding parts in which:

FIGURE 6 is a side elevation of the carriage;

FIGURE 7 is an enlarged sectional view, taken along the line 7—7 of FIGURE 6, of the fork tine locking device, forming part of my invention;

FIGURE 8 is a fragmentary view in section along the line 8—8 of FIGURE 7;

FIGURE 9 is an enlarged fragmentary view, taken along the line 9—9 of FIGURE 6, of the pivotal bracket mount, forming part of my invention; and FIGURE 10 is a sectional view taken along line 10—10 of FIGURE 9.

Figure 1:
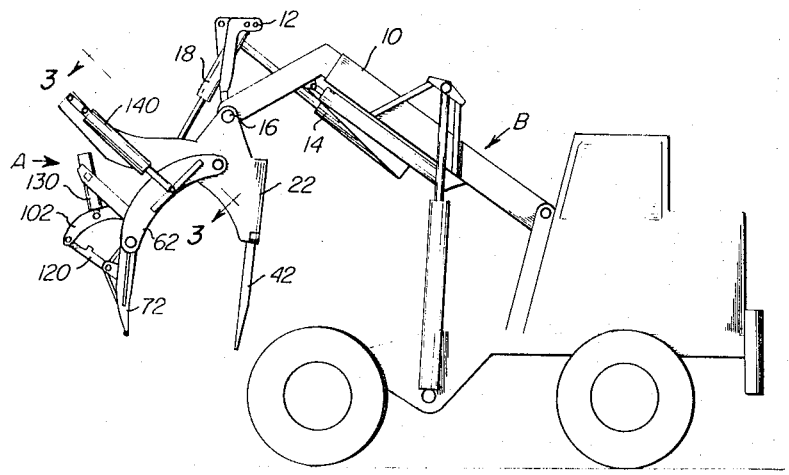
FIGURE 1 is a side elevational view of the carriage of the present invention, mounted on a mobile loader with the forks and clamping arms shown in one load pick-up position.

Referring now to the drawings, the carriage of the present invention, indicated generally at A, is shown in FIGURE 1 as being carried on the front end of a mobile loader B. The loader B, as set forth in my aforesaid copending application Serial No. 492,352 entitled "Front End Loader" filed September 20, 1965, includes a telescopic boom 10 and a tilt bracket 12 carried at its front end. The tilt bracket 12 is power actuated for swinging movement in a vertical plane by a tilt cylinder 14. According to the principles of my invention I provide a carriage A which is pivotally mounted on the front end of the boom 10 for rocking movement in a vertical plane about the same axis, as at 16, as the axis of rotation of the tilt bracket 12. Power means 18 connected between the tilt bracket 12 and the carriage A provide, in conjunction with the tilt cylinder 14, for swinging movement of the carriage A through a large vertical arc, as explained in my copending application referred to above.

The carriage A includes a pair of laterally spaced upstanding rear supports 20 and 22, each comprising a set of closely spaced parallel outer and inner side plates 24 and 26. The side plates 24 and 26 are identical in shape and are curved upwardly and rearwardly from their lower forward edge, as at 27a, and are inclined rearwardly and upwardly at their upper ends, as at 29. The forward curved edges of the plates 24 and 26 are connected by a filler plate 30 resulting in a curved load transmitting and cradling surface 31. The lower rear surfaces of plates 24 and 26 are provided with bracket means 32 for pivotally connecting the carriage to the boom 10. The supports 20 and 22 are connected laterally by tubular upper and lower members 23 and 25. In addition, braces 27 are provided between plates 24 and 26. A laterally extending pivotal bracket 33 is mounted between inner plates 26 to provide a suitable forward connection for the power means 18 connecting the carriage A with the tilt bracket 12. Pivotal bracket 33 is substantially the same as the bracket structure of the same type shown and described in my above identified copending application (and indicated generally by the reference numeral 184 in FIGURE 10 thereof).

Figure 4:
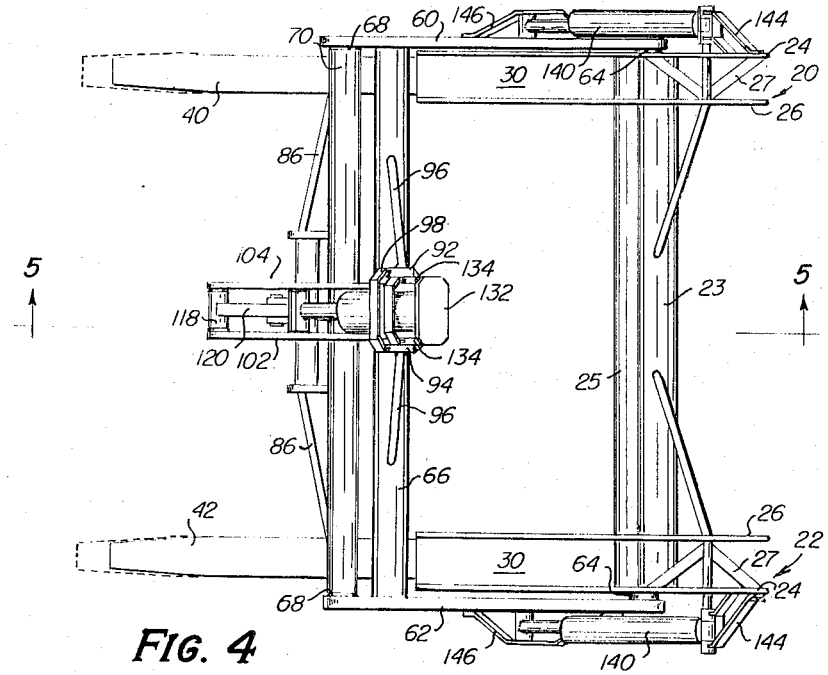
FIGURE 4 is a top view of the carirage.

The lower edges of plates 24 and 26 are straight and of sufficient length to mount and support a fork tine therein. To this end a pair of parallel spaced apart longitudinally extending fork tine support plates 34 and 36 are secured between the plates 24 and 26 adjacent their lower edges. A wrap around member 38 extends across the bottom and sides of plates 24 and 26 adjacent their forward lower edges and forwardly extending fork tines 40 and 42 are slidably positioned within supports 20 and 22, respectively, between the support plates 34 and 36. As seen in FIGURES 7 and 8, the fork tines 40 and 42 are adjustably mounted between the plates 34 and 36 by virtue of a series of longitudinally spaced holes 44 in each tine through at least one of which a locking pin 46 extends. The locking pin 46 extends through a hole 47 in each upper support plate 34 into engagement with each fork tine 40 and 42. The locking pin 46 is characterized by an upper loop portion 48 through which a longitudinally extending locking bar 50 extends to hold the pin 46 against jarring out. A bolt and nut combination 52 serves to removably secure the locking bar 50 in locking engagement with the loop portion 48 of the pin 46. As indicated by the dotted lines in FIGURE 4, the fork tines 40 and 42 may be adjusted longitudinally within the supports 20 and 22.

Pivotally carried by the supports 20 and 22 are a pair of laterally spaced forwardly extending load clamping arms 60 and 62 which are secured at their rear ends to the outer plates 24 of supports 20 and 22. Laterally outwardly extending bosses 64 on plates 24 rockably mount arms 60 and 62 for movement in a vertical plane about a horizontal axis 65 extending through the supports 20 and 22 generally intermediate the ends of the load cradling surface 31 thereof. The arms 60 and 62 are curved slightly so that when they are raised they form a generally smooth continuation of the load cradling surface 31. A rigid tubular member 66 extends between the arms 60 and 62 slightly rearwardly of their forward ends.

At their extreme forward ends arms 60 and 62 are equipped with laterally inwardly extending pivot bosses 68 which rotatably mount a laterally extending pivotal hold down finger support member 70. A centrally positioned forwardly extending hold down finger structure, indicated generally at 72, is rigidly secured at its rear end to the central portion of support member 70. The hold down finger structure 72 includes a pair of spaced longitudinally extending arms 74 and 76 connected at their forward end by a lateral member 78. Extending between arms 74 and 76 in spaced forward relation to support member 70 is a lateral member 80 upon which are rigidly mounted a pair of spaced upwardly and slightly rearwardly inclined lever members 82 and 84 connected at their upper ends by a lateral pin 85. Suitable bracing members 86 connect the arms 74 and 76 with support member 70 and lever members 82 with arms 74 and 76. The forward end of arms 74 and 76 are downwardly curved and equipped with a load gripping plate 87 having a raised pattern thereon.

The tubular member 66 connecting arms 60 and 62 behind support member 70 provides support for a rigidly mounted upstanding bracket structure 90 including spaced side plates 92 and 94 which are braced on their outer surfaces by diagonal bracing 96 connecting them with member 66. The forward surface of plates 92 and 94 is connected by a bridging member 98 adjacent the top of bracket structure 90 and their rear surfaces are connected by a bridging member 99 intermediate the length of bracket structure 90.

Also supported by the tubular member 66 extending between arms 60 and 62 is a centrally positioned pivotal link structure 100 that is mounted between plates 92 and 94 of bracket structure 90 for rocking movement in a vertical plane about member 66. The pivotal link structure 100 includes a pair of upstanding forwardly inclined parallel plates 102 and 104 that are rotatably mounted at their lower ends on member 66 by means of a pair of semi-cylindrical laterally extending upper and lower bearing members 106 and 108 which rotatably overlie member 66 between plates 92 and 94 of bracket structure 90. The bearing members 106 and 108 have laterally extending flanges 110 through which bolts 112 extend to rotatably mount the same on the member 66. Suitable shim material is placed between the flanges 110 to take up any slack therebetween and permit smooth rotation of the link structure 100. A greased fitting 114 is also supplied and the bearing members 106 and 108 are held against lateral movement by stop members 116 on member 66 adjacent the ends of members 106 and 108. The upper forward ends of plates 102 and 104 are connected by a lateral pin 118. Pivotally mounted at one end upon the pin 118 of link structure 100 and at its other end upon pin 85 connecting lever members 82 and 84 of hold down finger structure 72 is an elongated link 120 having a rearwardly extending stop member 122 between its ends and along its rear surface 124. Webbing 126 reinforces the ends of link 120. A lateral pin 128 connects plates 102 and 104 generally intermediate their length.

The hold down finger structure 72 is power actuated for load clamping, load supporting and load releasing operations. To this end, an hydraulic jack 130 is mounted in bracket 90 by means of a saddle 132 consisting of a pair of spaced pivot plates 134 that are rigidly connected to the cylinder of jack 130 adjacent its upper or closed end. The pivot plates 134 are rockably mounted between the upper ends of the side plates 92 and 94 of the bracket structure 90 by laterally inwardly extending pins 136 to allow the jack 130 to pivot thereabout in a generally vertical plane at the upper end of bracket structure 90. A bridging member 138 connects the plates 134 beneath the bridging member 98 of bracket structure 90. The piston rod 139 of jack 130 is pivotally joined by a sleeve at its end to the pin 128 connecting plates 102 and 104 of the link structure 100. When hold down finger means 72 is retracted the maximum extent relative to clamping arms 60 and 62 stop member 122 butts against the sleeve engaging pin 128, as seen in broken lines in FIGURES 5 and 6.

Extension and retraction of the piston rod 139 of jack 130 effects the raising and lowering of the hold down finger structure 72 about the axis of its rear support member 70 through the rotation of link structure 100 and the movement of link 120. Jack 130 is in a hydraulic circuit operated under fluid pressure under the control of the operator through valve means (not shown) which permits the introduction of fluid pressure to one of the ends of the jack cylinder while exhausting from the other end. Fluid under pressure is thus allowed to be retained in both ends of the cylinder of the jack to hold its piston and consequently the hold down finger structure 72 in any desired set angular position.

Figure 2:
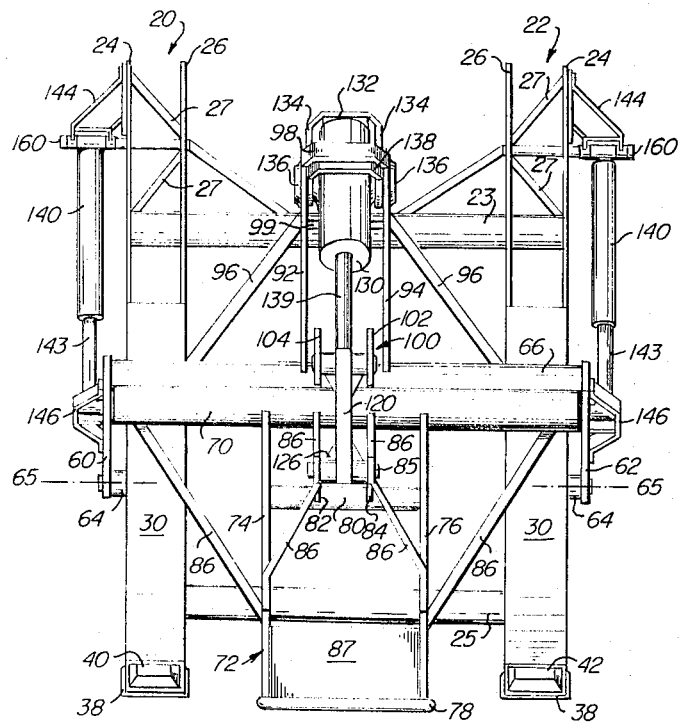
FIGURE 2 is a front view of the carriage.
Figure 3:
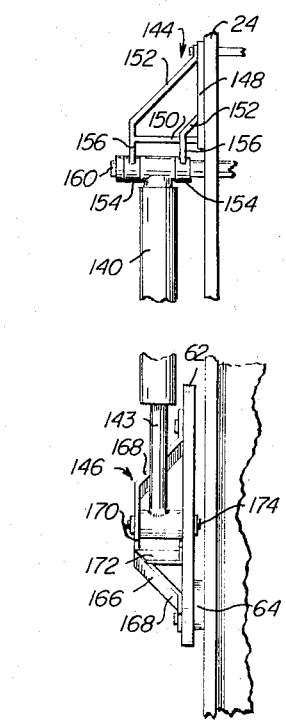
FIGURE 3 is an enlarged fragmentary view, taken along the line 3—3 of FIGURE 1.

Further provided are hydraulically actuated means for raising and lowering the clamping arms 60 and 62 about pivot axis 65. To this end a pair of parallel hydraulic jacks 140 are mounted laterally outwardly of supports 20 and 22. As best seen in FIGURES 2 and 3, the mounting means for jacks 140 includes an upper outrigger type bracket 144 extending laterally outwardly of the upper inclined ends of supports 20 and 22, and a lower outrigger type bracket 146 extending laterally outwardly from the middle part of each arm 60 and 62. The upper brackets 144 on supports 20 and 22, which are identical except for their opposed relationship to each other, each include a base member 148 secured in abuttingly relation to the outer plates 24 of supports 20 and 22 from the lower end of which extends laterally outwardly a support 150 which is strengthened by diagonal bracing 152. A pair of hollow aligned bosses 154 are secured to extensions 156 of bracing 152 below support 150 to provide means for mounting a laterally extending pin 160 therein which extends laterally inwardly therefrom through holes 162 in plates 24 and 26 of supports 20 and 22.

The lower brackets 146 each consist of an elongated strap 166 secured at each end to the outer surface of arms 60 and 62 and being laterally outwardly inclined adjacent each end, as at 168 and having a laterally outwardly disposed middle section 170 that is in spaced parallel relation to the outer surface of each arm 60 and 62. Bracing 172 prevents the middle section 170 of strap 166 from deflecting and a lateral pin 174 is connected between the middle section 170 of strap 166 and arms 60 and 62. The jacks 140 are each pivotally mounted at their upper ends to the pins 160 of brackets 144 and at their lower ends to the pins 174 of brackets 146.

Extension and retraction of the piston rod 143 of jacks 140 effects the raising and lowering of arms 60 and 62 about their pivot axis 65. Jacks 140 are in a hydraulic circuit operated under fluid pressure under the control of the operator through valve means (not shown) which permits the introduction of fluid pressure to one of the ends of the jack cylinders while exhausting from the other end. Fluid under pressure is thus allowed to be retained in both ends of each cylinder of the jacks to hold their pistons and consequently the arms 60 and 62 in any desired set angular position.

In the operation of a front end loader incorporating the carriage according to the present invention, the telescopic boom 10 is raised or lowered and/or retracted or extended by means of suitable hydraulic jacks or similar means, as shown in FIGURE 1. Tilt bracket 12 is swung in a vertical plane about its axis 16 by means of hydraulic jack 14 or similar means. The carriage A is rocked in movement in a vertical plane about the same axis 16 by means of hydraulic jack 18 and/or hydraulic jack 14 or similar power means. All of this movement is generally as described in my aforesaid copending application. Clamping arms 60 and 62 are moved toward and away from fork tines 40 and 42 by virtue of hydraulic jacks 140. The hold down finger structure 72 cooperates with arms 60 and 62 to firmly engage a load in the carrier by virtue of movement with arms 60 and 62 and by virtue of independent movement through operation of hydraulic jack 130.

Figure 5:
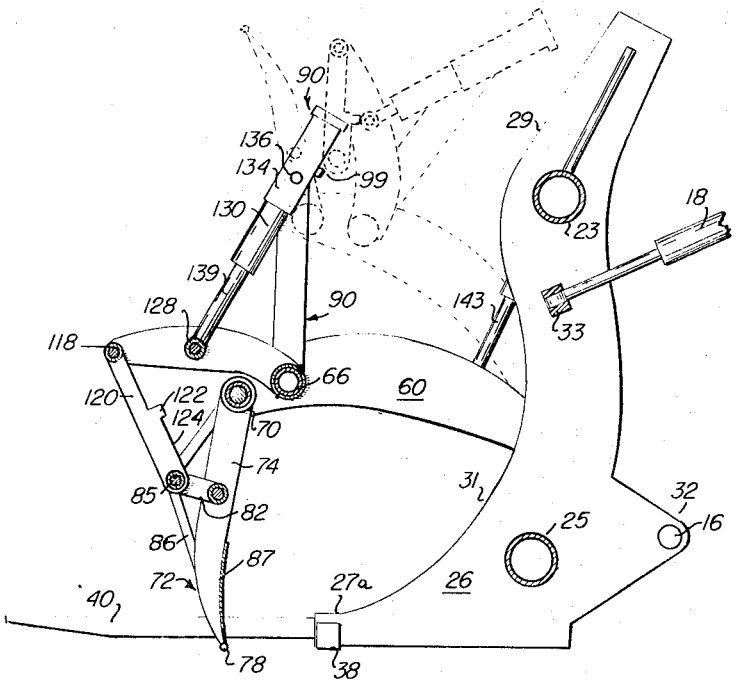
FIGURE 5 is a sectional view of the carriage, taken along line 5—5 of FIGURE 4.

In FIGURE 1 the carrier is shown with the fork tines in substantially vertical position which enables the operator to lower the carrier over a barrier wall such as the side of a truck or a gondola car or the like for the loading or unloading of articles therein. In FIGURE 5 the carrier is shown as it might be employed for a ground pickup or discharge, with the clamping arm and hold down finger being shown in closed load engaging position in full lines and in open position in broken lines. FIGURE 6 is similar but shows in broken line the clamping arms and hold down finger moved upwardly and rearwardly to permit the carrier to be used in handling palleted articles, stacked lumber, large crates and cartons and similar loads.

It is apparent that many modifications and variations of this invention as hereinbefore set forth may be made without departing from the spirit and scope thereof. The specific embodiments described are given by way of example only and the invention is limited only by the terms of the appended claims.

I claim:
1. A load handling carriage for a mobile loader comprising:
   (A) at least a pair of laterally spaced upstanding supports rigidly secured together,
   (B) fittings on said supports for pivotal attachment of the carriage to the end of an extensible boom of a mobile loader for swinging movement of the carriage in a vertical plane,
   (C) fittings on said supports for pivotal attachment of the carriage to extensible power means disposed between said carriage and a tilt bracket pivotally attached to the same boom for swinging movement on a common axis with the carriage,
   (D) at least a pair of lift fork tines each extending from the lower forward edge of one of said supports,
   (E) at least a pair of clamping arms each pivotally attached to one of said supports intermediate of the ends thereof,
   (F) extensible power means pivotally attached at one end to said clamping arms and at the opposite end to said supports adjacent the upper end thereof for relative movement between said arms and said supports and fork tines,
   (G) hold down finger means pivotally supported between the forward ends of said clamping arms, and
   (H) extensible power means carried by said clamping arms and connected to said hold down finger means for causing relative movement between said arms and finger means.

2. A load handling carriage according to claim 1 further characterized in that
   (A) a fixed horizontal rigid member extends laterally between said clamping arms adjacent the forward ends thereof,
   (B) an elongated upstanding fixed bracket is carried by said rigid member intermediate of the ends thereof,
   (C) an elongated pivotal bracket is carried by said same rigid member intermediate of the ends thereof,
   (D) one end of an extensible power means is pivotally supported in said fixed bracket and the opposite end of the extensible power means is pivotally attached to said pivotal bracket, and
   (E) a connecting link and lever pivotally attaches the forward end of said pivotal bracket to said hold down finger means.

3. A load handling carriage according to claim 2 further characterized in that
   (A) said fixed bracket is bifurcated and said extensible power means is pivotally supported therein in a saddle
   (B) said pivotal bracket is bifurcated and pivotally supported between the spaced sides of the fixed bracket
   (C) said connecting lever attached to said hold down finger means is bifurcated, and
   (D) said connecting link is pivotally attached at one end between the spaced sides of the pivotal bracket and at the opposite end between the spaced lever arms.

4. A load handling carriage according to claim 3 further characterized in that
   (A) said connecting link is provided with a rearwardly extending projection on its rearward edge, and
   (B) said extensible power means is pivotally attached said pivotal bracket by means of a horizontal sleeve at one end of said power means engaging a pin extending between the spaced sides of said bracket intermediate of the ends of the bracket, whereby said sleeve serves as a stop abutting means for said link when said hold down finger means is in farthestmost retracted position.

5. A load handling carriage according to claim 3 further characterized in that
   (A) said rigid member is circular in cross-section at least between the spaced side of said fixed bracket,
   (B) said pivotal bracket is attached to said rigid member by means of a sleeve bearing overlying said rigid member between the spaced sides of said fixed bracket, and
   (C) stop means are provided on said rigid member to limit horizontal movement of said sleeve bearing.

6. A load handling carriage according to claim 1 further characterized in that said fork tines are extensible relative to said upstanding supports.

7. A load handling carriage according to claim 6 further characterized in that
   (A) said laterally spaced upstanding suports are each comprised of spaced apart inner and outer plates rigidly secured together,
   (B) the bottom edge of each of said supports includes a lower plate extending between said inner and outer plates;
   (C) an upper plate extending between said inner and outer plates is spaced from said lower plate to define a fork tine receiving channel,
   (D) a fork tine is fitted with sliding engagement with said receiving channel,
   (E) a plurality of spaced apart pin-receiving apertures are disposed along the rearward portion of said fork tine,
   (F) a pair of locking pin receiving apertures in registry are disposed in said upper and lower plates,
   (G) a locking pin is provided extending through said apertures in said upper and lower plates and one of said apertures in said fork tine, and
   (H) locking means are provided for retaining said locking pin.

8. A load handling carriage according to claim 7 further characterized in that
   (A) said locking pin includes an upper loop,
   (B) a further pair of apertures in registry are disposed in said upper and lower plates, said apertures being spaced apart by the same distance as the apertures in said fork tine, and
   (C) said locking means includes
       (1) a bolt extending upwardly through said further apertures in said upper and lower plates and one of said apertures in said fork tine,
       (2) a locking bar having an aperture at one end fitted over the upper end of said bolt and secured therein by a nut, (3) the opposite end of said locking bar extending through said upper loop and bearing against the top of said locking pin.

9. A load handling carriage according to claim 1 further characterized in that
   (1) the forward edges of said upstanding supports are concave to form a load-receiving cradle in combination with said fork tines,
   (2) the lower edge surfaces of said clamping arms are concave with generally the same radius as the concave edges of the upstanding supports, and
   (3) the inner load-contacting surface of said hold down finger means is concave.

References Cited by the Examiner
UNITED STATES PATENTS 3,194,421  7/1965  Lull _____ 214—147
3,221,909  12/1965  Magnuson _____ 214—147

HUGO O. SCHULZ, *Primary Examiner.*